(12) United States Patent
Deeb et al.

(10) Patent No.: US 6,572,118 B2
(45) Date of Patent: Jun. 3, 2003

(54) FLEXIBLE SEAL MEMBER FOR NON-METALLIC CONDUIT TO CONCRETE MANHOLE JUNCTION

(75) Inventors: Fouad M. Deeb, Fort Wayne, IN (US); Michael R. Miller, Churubusco, IN (US); John M. Kurdziel, Fort Wayne, IN (US); James W. Skinner, Fort Wayne, IN (US); Ronald W. Neuhaus, Fort Wayne, IN (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 09/839,308

(22) Filed: Apr. 23, 2001

(65) Prior Publication Data

US 2002/0153668 A1 Oct. 24, 2002

(51) Int. Cl.[7] ................................................. F16L 21/02
(52) U.S. Cl. ....................... 277/616; 277/602; 277/605; 277/606; 277/626; 285/110; 285/230
(58) Field of Search ................................. 277/602, 605, 277/606, 616, 625, 626; 285/110, 230, 903

(56) References Cited

U.S. PATENT DOCUMENTS

| | | | |
|---|---|---|---|
| 3,787,061 A | | 1/1974 | Yoakum |
| 3,813,107 A | * | 5/1974 | Ditcher ........................ 277/605 |
| 4,242,164 A | * | 12/1980 | Skinner .................... 241/292.1 |
| 4,333,662 A | * | 6/1982 | Jones ......................... 277/606 |
| 4,342,462 A | | 8/1982 | Carlesimo |
| 4,350,351 A | | 9/1982 | Martin |
| 4,508,355 A | | 4/1985 | Ditcher |
| 4,663,036 A | * | 5/1987 | Strobl et al. ................... 405/52 |
| 4,809,994 A | * | 3/1989 | Skinner et al. ............. 277/606 |
| 5,248,154 A | * | 9/1993 | Westhoff et al. ............ 277/606 |
| RE34,787 E | | 11/1994 | Westhoff et al. |
| 5,529,312 A | | 6/1996 | Skinner et al. |
| 5,626,346 A | | 5/1997 | Gavin |
| 5,687,976 A | * | 11/1997 | Andrick et al. .............. 277/607 |
| 5,711,536 A | * | 1/1998 | Meyers ........................ 277/606 |
| 5,979,908 A | | 11/1999 | Jones |
| 6,176,493 B1 | * | 1/2001 | Whipps ....................... 277/630 |
| 6,364,373 B1 | * | 4/2002 | Brockway .................... 285/369 |
| 6,450,547 B1 | * | 9/2002 | Carlstrom ................... 285/110 |
| 6,457,725 B1 | * | 10/2002 | Jones .......................... 277/606 |

* cited by examiner

Primary Examiner—Anthony Knight
Assistant Examiner—Chris Boswell
(74) Attorney, Agent, or Firm—Kremblas, Foster, Phillips & Pollick

(57) ABSTRACT

A sealing member for sealing a joint between a pipe and a wall defining an opening is provided. The sealing member has an annular base, a projection, and preferably first and second annular flanges. The annular base has a bottom and first and second sidewalls. The projection is attached to the base for anchoring the sealing member within the wall. In some embodiments it extends radially outwardly from the base. The first and second annular flanges extend from opposite sidewalls of the base. The first and second flanges each have a top and a bottom surface. The top surfaces of each can have an annular depressed portion, and each of the bottom surfaces can have a plurality of grooves formed therein. Preferably, the base includes at least one cavity extending completely around the circumference of the sealing member. There is also disclosed the use of the sealing member in a concrete manhole structure having a wall defining an annular opening through which a pipe having an outer surface can pass so that a joint is defined between the wall and the outer surface, with the sealing member being encased in appropriate grout to secure the sealing member to the concrete structure. The sealing member thus effectuates sealing of the joint between the pipe and the wall defining the opening.

28 Claims, 4 Drawing Sheets

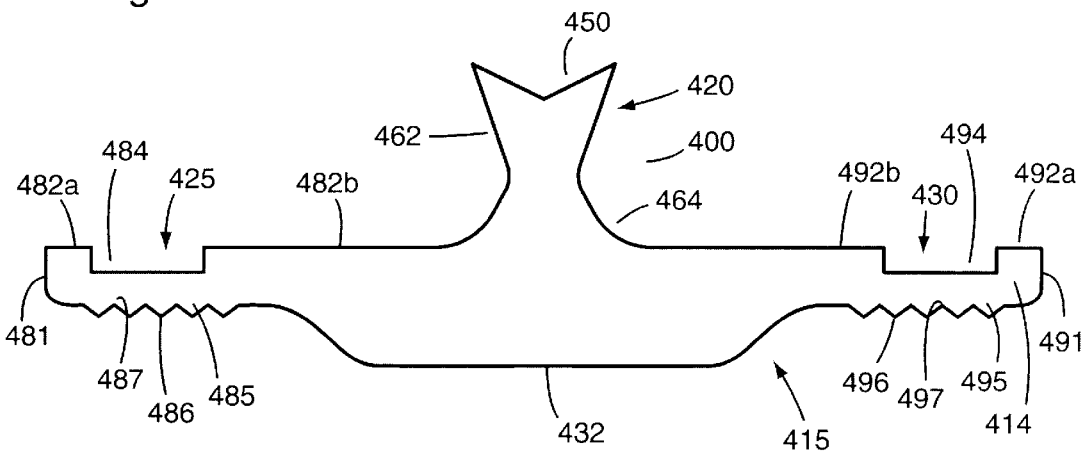
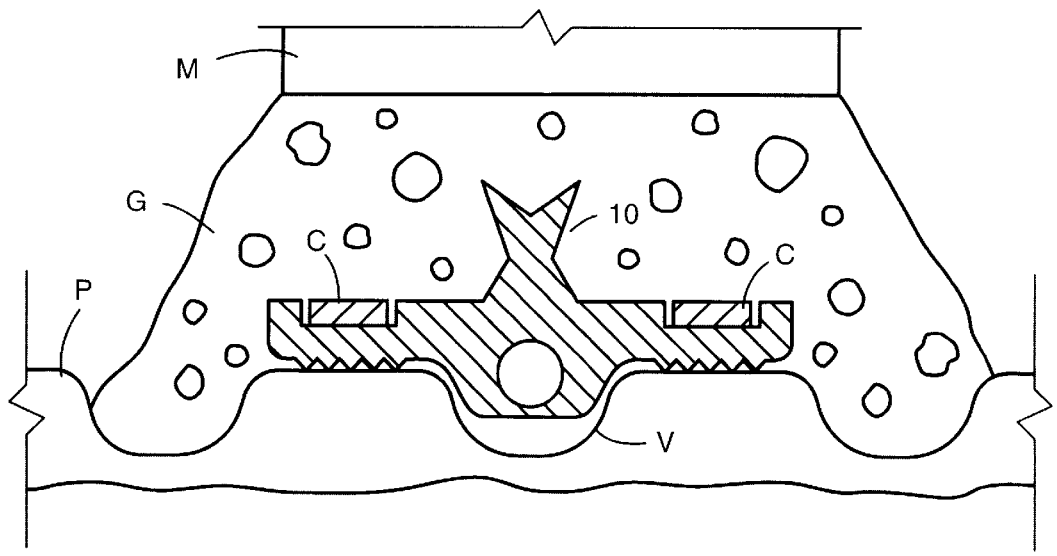

FLEXIBLE SEAL MEMBER FOR NON-METALLIC CONDUIT TO CONCRETE MANHOLE JUNCTION

FIELD OF THE INVENTION

The present invention relates generally to corrugated pipe, and more particularly, to a flexible seal member for embedding in the corrugation of a corrugated pipe at the junction of the pipe with a concrete member, such as a manhole to effectuate an essentially watertight seal.

BACKGROUND OF THE INVENTION

This invention is directed to the providing of an accessory for use with corrugated pipe, and more particularly for use with corrugated pipe at the junction of such pipe with a concrete manhole. The use of such items, referred to as gaskets, waterstops, grout boots, pipe adapters, manhole adapters, and grouting rings, that are embedded in precasted wall openings or ports of underground concrete structures such as manholes is well known. Regardless of the name given to the accessory, its use arises from the concern in sewer construction of the potential for leakage around a gasket joining an underground pipe and a wall opening after the connection and backfilling have been completed.

Various seal member configurations have been used or proposed to eliminate the problem. These proposals first were limited to situations where the pipe and manhole were both fabricated from clay pipe or concrete. In one prior art grouting ring for use with concrete pipe, a flat surface portion of the grouting ring is laid on the concrete pipe's outer surface. The grouting ring is then secured in place about the pipe by means of a conventional stainless steel clamp. The grouting ring then is encased in a non-shrink grout or patching compound, with the compound extending from the outer surface of the pipe to the inner surface of the manhole opening through which the pipe passes. The physical characteristics of concrete make it possible for the non-shrink grout to effect a watertight seal.

With the advent of plastic pipe, various seal member configurations have been proposed for use with concrete manholes and smooth wall plastic pipe. Examples include U.S. Pat. Nos. 3,787,061, 4,342,462, 4,350,351, 4,508,355, 5,529,312, 5,979,908, and U.S. Pat. No. Re. 34,787. Finally, as corrugated pipe began to be used in conjunction with concrete manholes, seal member configurations were proposed that could be used with corrugated pipe.

However, a problem with polyolefin pipe (i.e. one made from an olefin polymer such as polyethylene or polypropylene, is that nothing sticks to it, thereby presenting a problem in effectuating a watertight seal between the pipe and the cement or concrete.

It is thus apparent that the need exists for an adaptable seal member for embedding in the corrugation of a corrugated pipe at the junction of the pipe with a concrete manhole, such that an essentially watertight seal is created.

SUMMARY OF THE INVENTION

In accordance with this invention a sealing member for sealing a joint between a pipe and a wall defining an opening, with the sealing member having an annular base, a projection, and a first annular flange. The annular base has a bottom and first and second sidewalls. The projection is attached to the base for anchoring the sealing member within the wall. In some embodiments the projection extends radially outwardly from the base.

The first annular flange extends from the first sidewall of the base. A second annular flange may extend from the second sidewall of the base. The first and second flanges each have a top and a bottom surface. Each of the top surfaces can have an annular depressed portion, and each of the bottom surfaces can have a plurality of grooves formed therein.

Preferably, the first and second flanges are equal in length. Further, in the preferred embodiment of the invention, the base is of a first height and the projection is of a second height, with the second height being essentially greater than or equal to the first height. Preferably, the base includes at least one cavity extending completely around the circumference of the sealing member.

The projection has a top and a sidewall, with the sidewall having an intermediate portion. Preferably, the sidewall tapers inwardly between the base and the intermediate portion, and tapers outwardly between the intermediate portion and the top. The projection also has a top, with the top having a width, and each of the annular depressed portions have a width, preferably with the width of the projection top being wider than the width of one of the depressed portions. The top of the projection is also preferably tapered inwardly.

The pipe is preferably corrugated with a plurality of valleys and crowns, with the base providing for the self-centering of the sealing member in a valley of the corrugated pipe. As such, it can be appreciated that the base of the sealing member extends into at least portion of one valley. The sealing member is secured to the pipe by clamping means positioned over a crown of a corrugation of the pipe.

There is also disclosed a sealing member for sealing a joint between a pipe and a wall defining an opening, with the sealing member having an annular base, a projection, and a first annular flange. The annular base has a bottom and first and second sidewalls. The projection attached to and extending radially outwardly from the base is for anchoring the sealing member within the wall. The projection has a top and a sidewall, with the sidewall having an intermediate portion. The sidewall tapers inwardly between the base and the intermediate portion, and outwardly between the intermediate portion and the top.

The first annular flange extends from the first sidewall of the base. A second annular flange in most embodiments extends from the second sidewall of the base. The first and second flanges each have a top and bottom surface, with each of the top surfaces having an annular depressed portion, and with each of the bottom surfaces having a plurality of grooves formed therein.

The first and second flanges are preferably equal in length. The base is of a first height and the projection is of a second height, with the second height preferably being essentially greater than or equal to the first height. The base preferably includes at least one cavity extending completely around the circumference of the sealing member. The projection has a top having a width, and each of the annular depressed portions have a width. Preferably, the width of the projection top is wider than the width of one of the depressed portions. The top is also preferably tapered annularly inwardly towards the base.

There is also disclosed a concrete manhole structure with a wall defining an annular opening through which a pipe having an outer surface can pass so that a joint is defined between the wall and the outer surface, and a sealing member encased in appropriate grout to secure the sealing member to the concrete structure. The sealing member effectuates sealing of the joint between the pipe and the wall defining the opening. The sealing member has an annular base, a projection, and at least a first annular flange, although it can also have a second annular flange. The annular base has a bottom and first and second sidewalls. The projection is attached to and in the preferred embodiment of the invention extends radially outwardly from the base and is for anchoring the sealing member within the wall.

The first annular flange extends from a first sidewall of the base, and the second annular flange extends from a second sidewall of the base. The first and second flanges each have a top and bottom surface, with each of the top surfaces having an annular depressed portion. The sealing member is secured to the pipe at each depressed portion by clamping means. Also, each of the bottom surfaces have a plurality of grooves formed therein.

The pipe used in conjunction with this concrete manhole preferably is corrugated with valleys and crowns. As such, the base of the sealing member rests in one of the pipe corrugations, specifically within one of the valleys, such that the base effectively provides for the self-centering of the sealing member in a valley of the corrugated pipe. The sealing member is secured to the pipe by clamping means, with the clamping means positioned over at least a crown of a corrugation of the pipe. In its operative position with clamping means securing the sealing member to the pipe, the base of the sealing member fits snugly against the outer surface of the pipe. The sealing member is secured to the wall by grout, with the grout extending from the pipe to the wall, with the grout at least partially filling some of the corrugations in the pipe.

The primary objective of this invention is to provide a water-tight seal at the joint of a corrugated pipe and a concrete manhole.

Another objective is to provide a sealing member for effectuating such a water-tight seal, which sealing member is of relatively economical construction and is particularly easy to fabricate.

Another objective is to provide a sealing member for effectuating a water-tight seal between polyolefin pipe and a concrete structure, which seal can be installed on site using an appropriate grout to secure the sealing member to the concrete structure.

Other objects and advantages of the invention will be apparent from the following description, the accompanying drawings, and the appended claims.

BRIEF DESCRIPTION OF THE DRAWINGS

FIG. 8 is a front elevational view of another modified embodiment of the invention shown in FIG. 1.

FIG. 9 is a cross-sectional view disclosing the invention in use at the junction of a pipe with a concrete structure to effectuate an essentially watertight seal.

DETAILED DESCRIPTION OF THE DRAWINGS

Figure 1:
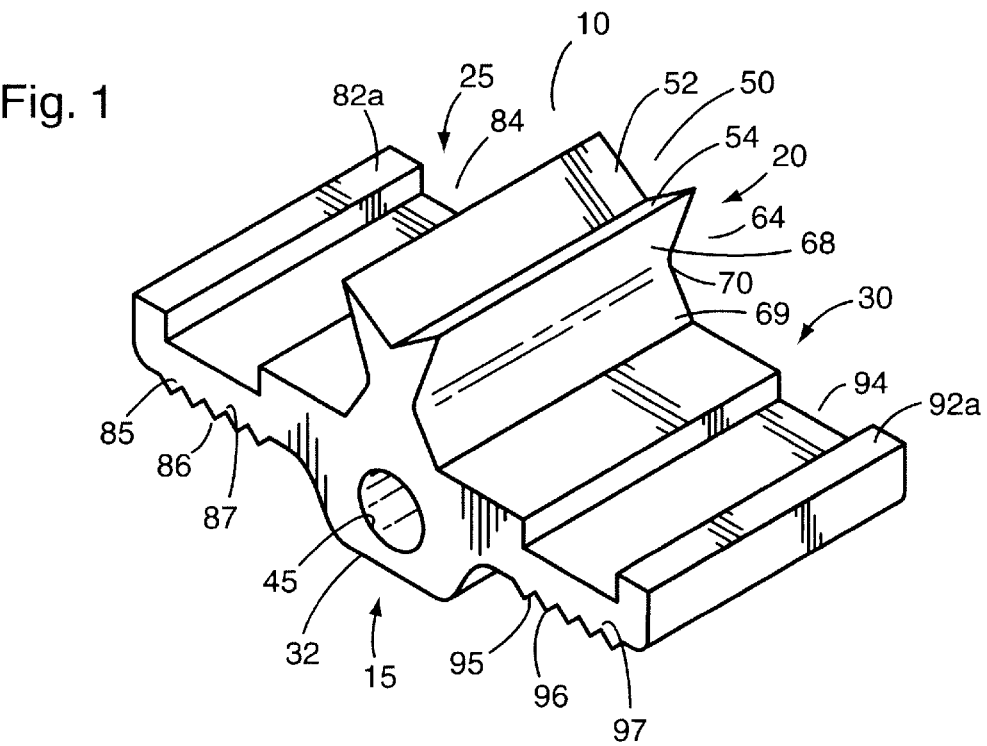
FIG. 1 is a perspective view of a seal member made in accordance with the present invention.
Figure 2:
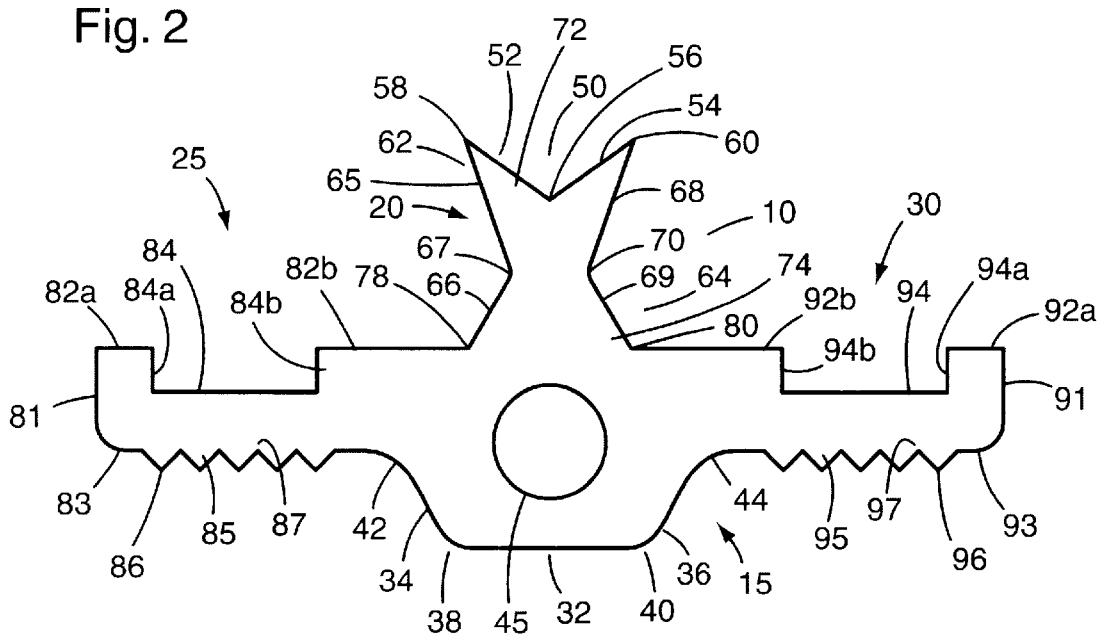
FIG. 2 is a front elevational view of the embodiment of the invention shown in FIG. 1.
Figure 3:
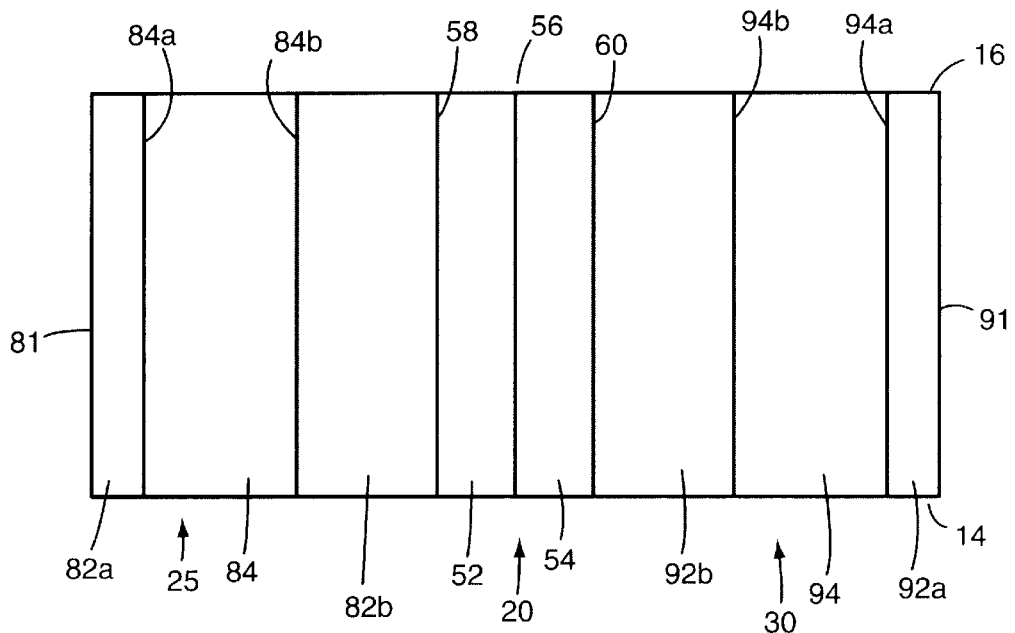
FIG. 3 is a top plan view of the embodiment of the invention shown in FIG. 1.
Figure 4:
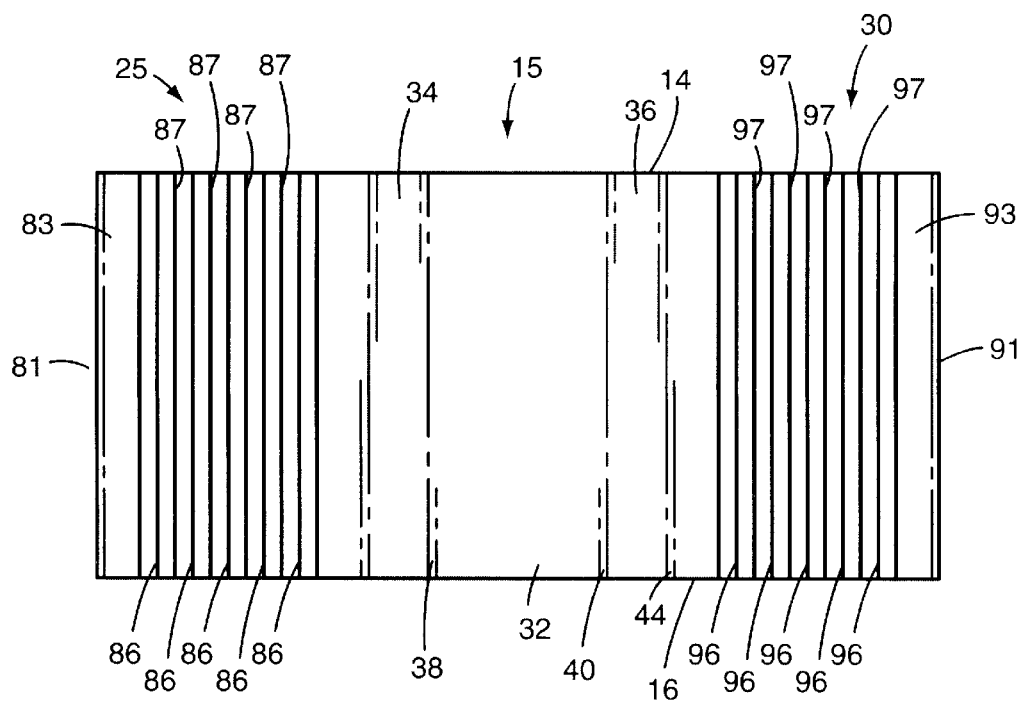
FIG. 4 is a rear plan view of the embodiment of the invention shown in FIG. 1.

Having reference to the drawings, attention is directed first to FIG. 1 which discloses a flexible seal member designated generally by the numeral 10, made in accordance with the present invention. This elastomeric sealing member features a base 15, an upright projection 20, called a grout boot in the trade, a first annular flange 25, and a second annular flange 30, although the member could be fabricated having just the one flange.

A comparison of FIGS. 1–4 disclose an embodiment of the invention preferably designed for use with 15" and 18" corrugated polyolefin plastic pipe. In this particular embodiment, the sealing member is shown as having two faces 14 and 16. It also has an annular base 15 which has a bottom 32 shown as being relatively flat, and first and second sidewalls 34 and 36 respectively, which extend upwardly from the bottom of the base at rounded corners 38 and 40 respectively. At the top of each of the sidewalls are concave rounded corners 42 and 44 respectively which abut the first and second annular flanges 25 and 30. As can best be appreciated from FIG. 2, the base includes a cavity 45 extending completely around the circumference of the sealing member.

Turning now to projection 20, a comparison of FIGS. 1–4 disclose that it is attached to the base. Its purpose is to anchor the sealing member 10 within the wall, and more specifically to the appropriate grout which attaches to the wall. In the embodiments shown, the projection can be appreciated as also extending radially outwardly from the base.

The grout which is used with the concrete of the wall is an appropriate concrete grout, including but not limited to concrete or cement itself. The projection 20 has a top 50 and a sidewall shown as having sides 62 and 64. The top 50 has a first portion 52 and a second portion 54 separated by an intermediate portion 56. It will be readily appreciated that the top tapers inwardly annularly towards the base with its lowermost point being at the intermediate portion 56. Preferably the first and second portions 52 and 54 respectively are planar, and extend from edges 58 and 60 respectively to the intermediate portion 56.

Projection side 62 has an upper portion 65 and a lower portion 66 separated by an intermediate portion 67. Similarly, projection side 64 has an upper portion 68 and a lower portion 69 separated by an intermediate portion 70. Each sidewall 62 and 64 tapers inwardly between the base and its respective intermediate portion. Further, each sidewall tapers outwardly between its respective intermediate portion and the top, with each of the sidewalls terminating at the top's edges 58 and 60. The base 15 associated with the sealing member 10 is of a first height and the projection 20 is of a second height, such that in the preferred embodiment of the invention the second height is essentially greater than or equal to the first height.

The first annular flange 25 extends laterally from the first sidewall 34 of the base 15. It has an end wall 81 and an upper or top surface shown as having sections 82a and 82b. Section 82a is shown as being directly adjacent end wall 81 with section 82b shown as extending to juncture 78 of the first annular flange 25 with the lower portion 66 of the projection. Between the two sections of the upper surface of the first flange 25 is a depressed portion 84. It is shown as having sidewall 84*a* and 84*b* which extend upwardly from the annular depressed portion 84 to the upper surface of the first flange. The width of one of the annular depressed portions is preferably less than the width of the top of the projection.

The first flange 25 also has a lower surface 83 with a plurality of grooves 85 formed therein. It will be appreciated from the drawings that the crest 86 of each groove extends below the section of the lower or bottom surface 83 directly adjacent end wall 81, as well as the section of the lower surface 83 directly adjacent to the juncture of the first flange with the base at concave rounded corner 42, with each crest coming generally to a point. Similarly, the valley 87 of each groove extends above the section of the lower surface 83 directly adjacent end wall 81, as well as the section of the lower surface 83 directly adjacent to the juncture of the first flange with the base at concave rounded corner 42.

The second annular flange 30 extends laterally from the second sidewall 36 of the base 15. It has an end wall 91 and an upper or top surface shown as having sections 92*a* and 92*b*. Section 92*a* is shown as being directly adjacent end wall 91 with section 92*b* shown as extending to juncture 80 of the second annular flange 30 with the lower portion 69 of the projection. Between the two sections of the upper surface of the second flange 30 is a depressed portion 94. It is shown as having sidewall 94*a* and 94*b* which extend upwardly from the annular depressed portion 94 to the upper surface of the second flange.

The second flange 30 also has a lower or bottom surface 93 with a plurality of grooves 95 formed therein. It will be appreciated from the drawings that the crest 96 of each groove extends below the section of the lower surface 93 directly adjacent end wall 91, as well as the section of the lower surface 93 directly adjacent to the juncture of the second flange with the base at concave rounded corner 44, with each crest coming generally to a point. Similarly, the valley 97 of each groove extends above the section of the lower surface 93 directly adjacent end wall 91, as well as the section of the lower surface 93 directly adjacent to the juncture of the second flange with the base at concave rounded corner 44. In the preferred embodiment of the invention the first and second flanges are equal in length as they extend laterally from the base 15.

As to dimensions of the embodiment of the invention shown in FIGS. 1–4 designed for use with 15" and 18" corrugated pipe, the overall width of the sealing member is 4.00" and the height of the sealing member is 2.291". The width of the top is 1.000" and the width of the depressed portion is 0.750". The distance from the top to the intermediate portions of each of the projection sidewalls is 0.700", with the width of the projection at the intermediate portion being 0.400". The distance between crests is 0.200". The depth of the depressed portion is 0.157", and the width of the flange upper surface between the depressed portion and the end wall is 0.317". The distance between the upper and lower surfaces of the flanges is 0.444". The cavity has a diameter of 0.655", and the distance between the bottom of the base and the cavity is 0.428".

Figure 5:
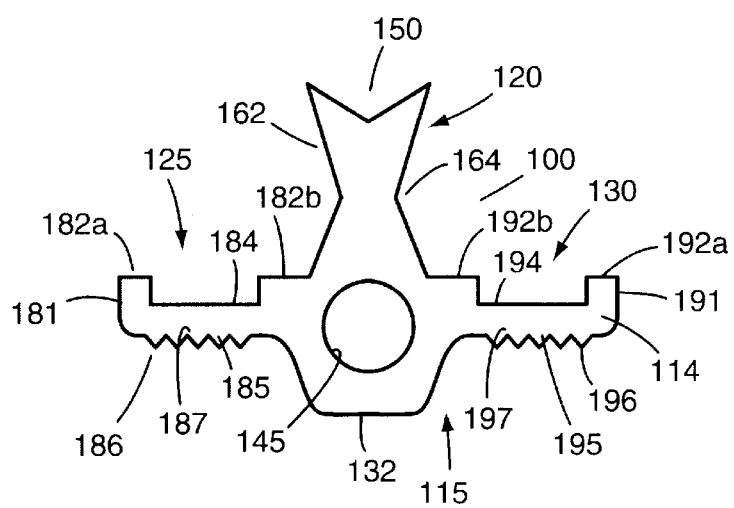
FIG. 5 is a front elevational view of a modified embodiment of the invention shown in FIG. 1.

The embodiment of the invention disclosed in FIG. 5 is designed for use with 12" corrugated pipe. This embodiment of sealing member is designated generally by the numeral 100. It will be appreciated that it is structurally similar to the sealing member of FIG. 2, except for some dimensional considerations. Thus, it has a base 115, a projection 120, a first flange 125 and a second flange 130. For example, the base has a bottom 132, the projection has a top 150 and sides 162 and 164. Furthermore, the first flange 125 has an end 181, top surface portions 182*a* and 182*b*, a depressed portion 184, and grooves 185 with crests 186 and valleys 187. Still further, the second flange 130 has an end 191, top surface portions 192*a* and 192*b*, a depressed portion 194, and grooves 195 with crests 196 and valleys 197.

As to dimensions of the embodiment of the invention shown in FIG. 5 designed for use with 12" corrugated pipe, the overall width of the sealing member is 3.07" and the height of the sealing member is 2.024". The width of the top is 0.768" and the width of the depressed portion is 0.700". The distance from the top to the intermediate portions of each of the projection sidewalls is 0.670", with the width of the projection at the intermediate portion being 0.307". The distance between crests is 0.154". The depth of the depressed portion is 0.121", and the width of the flange upper surface between the depressed portion and the end wall is 0.216". The distance between the upper and lower surfaces of the flanges is 0.341". The cavity has a diameter of 0.503", and the distance between the bottom of the base and the cavity is 0.328".

Figure 6:
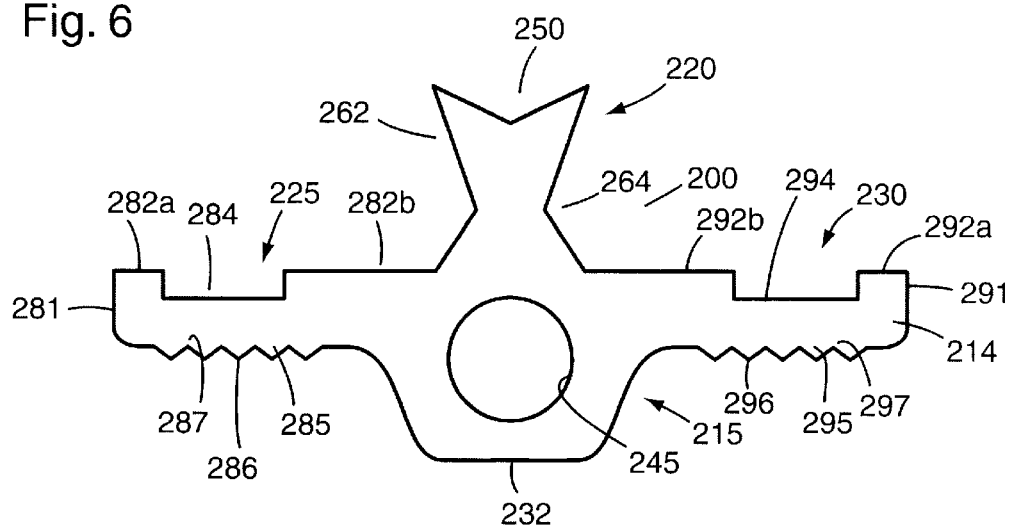
FIG. 6 is a front elevational view of another modified embodiment of the invention shown in FIG. 1.

The embodiment of the invention disclosed in FIG. 6 is designed for use with 24" corrugated pipe. This embodiment of sealing member is designated generally by the numeral 200. It will be appreciated that it is also structurally similar to the sealing member of FIG. 2, except for some dimensional considerations. Thus, it has a base 215, a projection 220, a first flange 225 and a second flange 230. For example, the base has a bottom 232, the projection has a top 250 and sides 262 and 264. Furthermore, the first flange 225 has an end 281, top surface portions 282*a* and 282*b*, a depressed portion 284, and grooves 285 with crests 286 and valleys 187. Still further, the second flange 230 has an end 291, top surface portions 292*a* and 292*b*, a depressed portion 294, and grooves 295 with crests 296 and valleys 297.

As to dimensions of the embodiment of the invention shown in FIG. 5 designed for use with 24" corrugated pipe, the overall width of the sealing member is 5.000" and the height of the sealing member is 2.350". The width of the top is 1.000" and the width of the depressed portion is 0.750". The distance from the top to the intermediate portions of each of the projection sidewalls is 0.700", with the width of the projection at the intermediate portion being 0.400". The distance between crests is 0.200". The depth of the depressed portion is 0.157", and the width of the flange upper surface between the depressed portion and the end wall is 0.317". The distance between the upper and lower surfaces of the flanges is 0.444", and the vertical distance from the lower surface of the flanges to the top of the projection is 1.629", the same distance as in the sealing member of FIG. 2. The cavity has a diameter slightly greater than 0.655".

Figure 7:
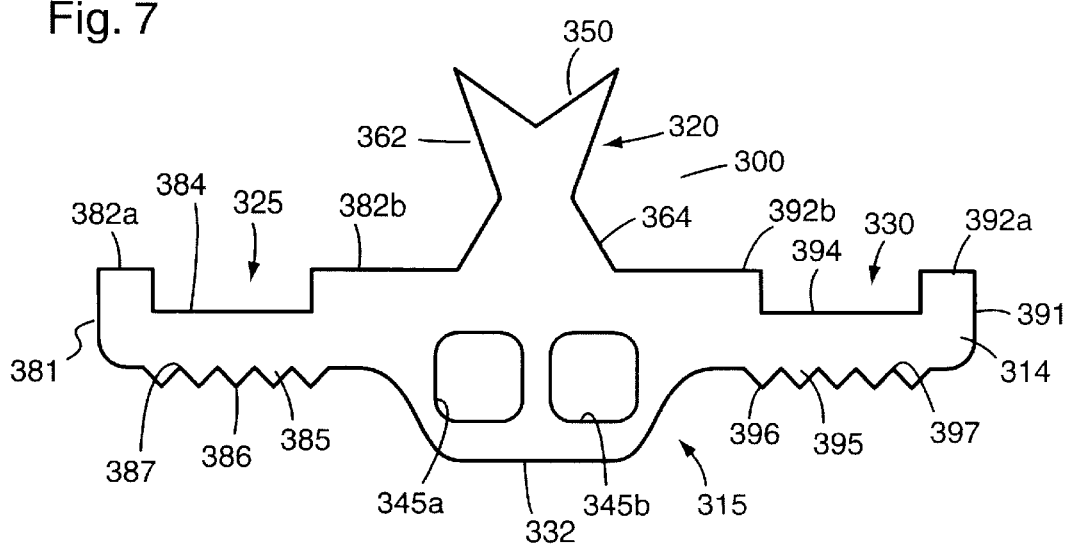
FIG. 7 is a front elevational view of another modified embodiment of the invention shown in FIG. 1.

The embodiment of the invention disclosed in FIG. 7 is designed for use with 30" corrugated pipe. This embodiment of sealing member is designated generally by the numeral 300. It will be appreciated that it is also structurally similar to the sealing member of FIG. 2, except for some dimensional considerations, and the obvious fact that it has two cavities formed therein. Thus, it has a base 315, a projection 320, a first flange 325 and a second flange 330. For example, the base has a bottom 332, the projection has a top 350 and sides 362 and 364. Furthermore, the first flange 325 has an end 381, top surface portions 382*a* and 382*b*, a depressed portion 384, and grooves 385 with crests 386 and valleys 387. Still further, the second flange 330 has an end 391, top surface portions 392*a* and 392*b*, a depressed portion 394, and grooves 395 with crests 396 and valleys 397.

As to dimensions of the embodiment of the invention shown in FIG. 7 designed for use with 30" corrugated pipe, the overall width of the sealing member is 5.482" and the height of the sealing member is 2.350". The width of the top is 1.000" and the width of the depressed portion is 0.750". The distance from the top to the intermediate portions of each of the projection sidewalls is 0.700", with the width of the projection at the intermediate portion being 0.400". The distance between crests is 0.200". The depth of the depressed portion is 0.157", and the width of the flange upper surface between the depressed portion and the end wall is 0.317". The distance between the upper and lower surfaces of the flanges is 0.444", and the vertical distance from the lower surface of the flanges to the top of the projection is 1.629", the same distance as in the sealing member of FIG. 2.

The embodiment of the invention disclosed in FIG. 8 is designed for use with 36" corrugated pipe. This embodiment of sealing member is designated generally by the numeral 400. It will be appreciated that it is also structurally similar to the sealing member of FIG. 2, except for some dimensional considerations, and the obvious fact that it has no cavity formed therein. Thus, it has a base 415, a projection 420, a first flange 425 and a second flange 430. For example, the base has a bottom 432, the projection has a top 450 and sides 462 and 464. Furthermore, the first flange 425 has an end 481, top surface portions 482a and 482b, a depressed portion 484, and grooves 485 with crests 486 and valleys 487. Still further, the second flange 430 has an end 491, top surface portions 492a and 492b, a depressed portion 494, and grooves 495 with crests 496 and valleys 497.

As to dimensions of the embodiment of the invention shown in FIG. 8 designed for use with 36" corrugated pipe, the overall width of the sealing member is 6.656" and the height of the sealing member is 2.000". The width of the top is 1.000" and the width of the depressed portion is 0.750". The distance from the top to the intermediate portions of each of the projection sidewalls is 0.700", with the width of the projection at the intermediate portion being 0.400". The distance between crests is 0.200". The depth of the depressed portion is 0.157", and the width of the flange upper surface between the depressed portion and the end wall is 0.317". The distance between the upper and lower surfaces of the flanges is 0.444", and the vertical distance from the lower surface of the flanges to the top of the projection is 1.629", the same distance as in the sealing member of FIG. 2.

The use of the seal member of this invention is shown in FIG. 9. The elastomeric sealing member 10 is secured to a corrugated pipe P, such that the base extends downwardly into a valley V in the pipe. Clamps C, preferably made of stainless steel, secure the sealing member 10 to the pipe P. The clamping means C are placed and tightened at the depressed portions of the flanges, such that the bottom surface of the flange is adjacent the top of the corrugation of the pipe P. This results in there being a positive double clamp location. Of course, it should be appreciated that the sealing member of this invention could, instead of having depressed portions, have raised portions to which concave clamping means are applied to secure the sealing member to the pipe.

When the pipe P is inserted into the concrete manhole M, the sealing member 10 then has grout G applied thereto to fill in the space between the manhole and the pipe, such that the grout boot or waterstop becomes embedded in the grout. The sealing member is secured to the wall by the grout, with the grout extending from the pipe to the wall, typically at least partially filling other corrugations in the pipe.

As a result of the characteristics of the structure of the invention, a sealing member is provided for embedding in the corrugation of a corrugated pipe at the junction of the pipe with a concrete manhole to effectuate a water-tight seal.

Furthermore, a sealing member is provided with a base which provides for the self-centering of the sealing member in the corrugation of a corrugated pipe, thus enabling the clamping means to be positioned over the strongest part of the pipe, the crown of each corrugation, to provide excellent sealing and minimizing if not eliminating the possibility of the seal moving while on the pipe.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. A sealing member for sealing a joint between a pipe and a wall defining an opening, said sealing member comprising
   an annular base, having a bottom and first and second sidewalls,
   a projection attached to said base for anchoring said sealing member within the wall, said projection having a top and a sidewall, and
   a first annular flange extending from said first sidewall of said base, said first flange having a top and a bottom surface, said projection top spaced a distance above said first flange top and at least a portion of said flange sidewall spaced a distance above said first flange top.

2. The sealing member according to claim 1 which includes a second annular flange extending from said second sidewall of said base, said second flange having a top and a bottom surface.

3. The sealing member according to claim 2 wherein each of said top surfaces has an annular depressed portion.

4. The sealing member according to claim 3, wherein said projection has a top, said top having a width, each of said annular depressed portions having a width, said width of said projection top being wider than said width of one of said depressed portions.

5. The sealing member according to claim 2 wherein said first and second flanges are equal in length.

6. The sealing member according to claim 1 wherein said projection extends radially outwardly from said annular base.

7. The sealing member according to claim 1 wherein said base is of a first height and said projection is of a second height, with said second height being essentially greater than or equal to said first height.

8. The sealing member according to claim 1 wherein said base includes at least one cavity extending completely around the circumference of said sealing member.

9. The sealing member according to claim 1 wherein said projection has a top, said top being tapered inwardly.

10. A sealing member for sealing a joint between a pipe and a wall defining an opening, said sealing member comprising
    an annular base, having a bottom and first and second sidewalls,
    a projection attached to said base for anchoring said sealing member within the wall,
    a first annular flange extending from said first sidewall of said base, said first flange having a top and a bottom surface, and
    a second annular flange extending from said second sidewall of said base, said second flange having a top and a bottom surface, each of said bottom surfaces having a plurality of grooves formed therein.

11. A sealing member for sealing a joint between a pipe and a wall defining an opening, said sealing member comprising
   an annular base, having a bottom and first and second sidewalls,
   a projection attached to said base for anchoring said sealing member within the wall, said projection has a top and a sidewall, said sidewall having an intermediate portion, said sidewall tapering inwardly between said base and said intermediate portion, said sidewall tapering outwardly between said intermediate portion and said projection top,
   a first annular flange extending from said first sidewall of said base, said first flange having a top and a bottom surface, and
   a second annular flange extending from said second sidewall of said base, said second flange having a top and a bottom surface.

12. A sealing member for sealing a joint between a pipe, said pipe being corrugated with a plurality of valleys and crowns, and a wall defining an opening, said sealing member comprising
   an annular base, having a bottom and first and second sidewalls, said base extending into at least a portion of one valley,
   a projection attached to said base for anchoring said sealing member within the wall, and
   a first annular flange extending from said first sidewall of said base, said first flange having a top and a bottom surface.

13. The sealing member according to claim 12 wherein said base provides for the self-centering of said sealing member. in a valley of said corrugated pipe, said sealing member being secured to said pipe by clamping means, said clamping means positioned over a crown of a corrugation of said pipe.

14. The sealing member according to claim 12 which includes a second annular flange extending from said second sidewall of said base, said second flange having a top and a bottom surface.

15. The sealing member according to claim 12 wherein said projection extends radially outwardly from said annular base.

16. The sealing member according to claim 12 wherein each of said top surfaces has an annular depressed portion.

17. The sealing member according to claim 12 wherein said first and second flanges are equal in length.

18. The sealing member according to claim 12 wherein said base is of a first height and said projection is of a second height, with said second height being essentially greater than or equal to said first height.

19. The sealing member according to claim 12 wherein said base includes at least one cavity extending completely around the circumference of said sealing member.

20. The sealing member according to claim 12 wherein said projection has a top, said top having a width, each of said annular depressed portions having a width, said width of said projection top being wider than said width of one of said depressed portions.

21. The sealing member according to claim 12 wherein said projection has a top, said top being tapered inwardly.

22. A sealing member for sealing a joint between a pipe and a wall defining an opening, said sealing member comprising
   an annular base, having a bottom and first and second sidewalls,
   a projection attached to and extending radially outwardly from said base for anchoring said sealing member within the wall, said projection having a top and a sidewall, said sidewall having an intermediate portion, said sidewall tapering inwardly between said base and said intermediate portion, said sidewall tapering outwardly between said intermediate portion and said top, and
   a first annular flange extending from said first sidewall of said base, said first flange having a top and a bottom surface, said top surface having an annular depressed portion, said bottom surface having a plurality of grooves formed therein.

23. The sealing member according to claim 22 which includes a second annular flange extending from said second sidewall of said base, said second flange having a top and a bottom surface, said top surface having an annular depressed portion, said bottom surface having a plurality of grooves formed therein.

24. The sealing member according to claim 22 wherein said base includes at least one cavity extending completely around the circumference of said sealing member.

25. A concrete manhole structure comprising,
   a wall defining an annular opening through which a corrugated pipe having an outer surface can pass so that a joint is defined between the wall and the outer surface,
   a sealing member for sealing said joint between the pipe and the wall defining an opening, said sealing member comprising
      an annular base, having a bottom and first and second sidewalls,
      a projection attached to and extending radially outwardly from said base for anchoring said sealing member within the wall,
      a first annular flange extending from said first sidewall of said base,
      a second annular flange extending from said second sidewall of said base, said first and second flanges each having a top and bottom surface, each of said top surfaces having an annular depressed portion, said sealing member being secured to the pipe at each depressed portion by clamping means, each of said bottom surfaces having a plurality of grooves formed therein.

26. The concrete manhole structure of claim 25 wherein said pipe has corrugations formed therein, said base resting in one of the pipe corrugations.

27. The concrete manhole structure of claim 25 wherein said sealing member is secured to said wall by grout, with the grout extending from the pipe to the wall, said grout at least partially filling corrugations in said pipe.

28. The concrete manhole structure of claim 25 wherein said pipe is corrugated with a plurality of valleys and crowns, said base providing for the self-centering of said sealing member in the valley of said corrugated pipe, said sealing member being secured to said pipe by clamping means, said clamping means positioned over at least a crown of a corrugation of said pipe.

* * * * *